US012779915B2

(12) United States Patent
Bowe et al.

(10) Patent No.: US 12,779,915 B2
(45) Date of Patent: Nov. 3, 2026

(54) REMOVABLE GOOSENECK HITCH BALL

(71) Applicant: Curt Manufacturing, LLC, Eau Claire, WI (US)

(72) Inventors: Curtis M. Bowe, Chippewa Falls, WI (US); Joel D. Diller, Eau Claire, WI (US); Ezekiel Hollaren, Baltic, SD (US)

(73) Assignee: CURT Manufacturing, LLC, Eau Claire, WI (US)

( * ) Notice: Subject to any disclaimer, the term of this patent is extended or adjusted under 35 U.S.C. 154(b) by 845 days.

(21) Appl. No.: 18/136,292

(22) Filed: Apr. 18, 2023

(65) Prior Publication Data

US 2023/0347696 A1 Nov. 2, 2023

Related U.S. Application Data

(60) Provisional application No. 63/331,986, filed on Apr. 18, 2022.

(51) Int. Cl.

*B60D 1/06* (2006.01)
*B60D 1/50* (2006.01)
*B60D 1/52* (2006.01)

(52) U.S. Cl.

CPC ................ *B60D 1/06* (2013.01); *B60D 1/50* (2013.01); *B60D 1/52* (2013.01)

(58) Field of Classification Search

CPC ... B60D 1/52; B60D 1/05; B60D 1/50; B60D 1/46; B60D 1/488; B60D 1/065; B62D 53/0807; B62D 53/0828

See application file for complete search history.

(56) References Cited

U.S. PATENT DOCUMENTS

| | | | |
|---|---|---|---|
| 2,878,036 | A | 3/1959 | Simmons |
| 3,600,004 | A | 8/1971 | Newkirk |
| 3,731,950 | A | 5/1973 | Burcham |
| 4,211,427 | A | 7/1980 | Young et al. |
| 4,351,542 | A | 9/1982 | Lovell et al. |
| 4,746,138 | A | 5/1988 | James |
| 4,773,668 | A | 9/1988 | Muonro |

(Continued)

FOREIGN PATENT DOCUMENTS

| | | | |
|---|---|---|---|
| EP | 0022674 | A1 | 1/1981 |
| FR | 2678554 | A1 | 1/1993 |

(Continued)

*Primary Examiner* — Jacob D Knutson
*Assistant Examiner* — Abigail R Hymel
(74) *Attorney, Agent, or Firm* — Shewchuk IP Services, LLC; Jeffrey D. Shewchuk

(57) ABSTRACT

A removable gooseneck hitch ball has a hitch ball extending over a neck and supported by a shank, possibly with the hitch ball on a pivoting head. The shank has a plurality of arc contact surfaces (such as four) collectively defining a cylinder centered on the shank's central axis. Flat contact surfaces extend parallel to the shank's central axis and inside the cylinder defined by the arc contact surfaces (such as four flat contact surfaces defining a square). The shank can be matingly received in a cylindrical socket of the towing vehicle with the arc surfaces in contact with the cylindrical socket or can be matingly received in a prism shaped (square in horizontal cross-section) socket with the flat surfaces in contact with the prism shaped socket.

19 Claims, 16 Drawing Sheets

(56) References Cited

U.S. PATENT DOCUMENTS

| | | | | |
|---|---|---|---|---|
| 4,817,978 | A | 4/1989 | James | |
| 5,016,898 | A | 5/1991 | Works et al. | |
| 5,118,127 | A | 6/1992 | Partington | |
| 5,375,867 | A | 12/1994 | Kass et al. | |
| 5,647,603 | A | 7/1997 | Kass et al. | |
| 5,683,094 | A | 11/1997 | Gullickson | |
| 5,823,560 | A | 10/1998 | Van Vleet | |
| 5,873,594 | A | 2/1999 | McCoy et al. | |
| 5,975,553 | A | 11/1999 | Van Vleet | |
| 6,095,545 | A | 8/2000 | Bol, II et al. | |
| 6,494,478 | B1 | 12/2002 | MacKarvich | |
| 6,581,953 | B2 | 6/2003 | Jerry | |
| 6,695,338 | B1 * | 2/2004 | Roberts | B60D 1/06 280/514 |
| 6,722,682 | B2 | 4/2004 | Valliere et al. | |
| 6,834,879 | B1 | 12/2004 | Lorman | |
| 6,913,276 | B1 | 7/2005 | Bauder | |
| 6,926,261 | B1 | 8/2005 | Renshaw | |
| 6,969,090 | B1 | 11/2005 | Works | |
| 7,025,370 | B2 | 4/2006 | Anderson et al. | |
| 7,044,493 | B1 | 5/2006 | Wilson | |
| 7,093,845 | B1 | 8/2006 | Fast | |
| 7,152,870 | B2 | 12/2006 | Gurtler | |
| 7,168,727 | B2 | 1/2007 | Dick | |
| 7,222,872 | B1 | 5/2007 | Bauder | |
| 7,377,536 | B2 | 5/2008 | Rehme | |
| 7,380,811 | B2 | 6/2008 | Rehme | |
| 7,740,266 | B2 | 6/2010 | Marcy | |
| 8,328,222 | B1 | 12/2012 | Roeber et al. | |
| 9,505,281 | B1 | 11/2016 | Borkholder | |
| 9,868,327 | B1 | 1/2018 | Borkholder | |
| 10,183,536 | B2 | 1/2019 | McCoy et al. | |
| 10,639,950 | B2 | 5/2020 | Borkholder | |
| 11,192,408 | B2 | 12/2021 | Fisher et al. | |
| 2006/0097483 | A1 * | 5/2006 | White | B60D 1/06 280/511 |
| 2006/0170192 | A1 * | 8/2006 | Gurtler | B62D 53/061 280/441.2 |
| 2015/0343866 | A1 | 12/2015 | Williams | |
| 2020/0031185 | A1 | 1/2020 | Singh | |
| 2022/0363096 | A1 * | 11/2022 | Doman | B60D 1/065 |

FOREIGN PATENT DOCUMENTS

| | | | |
|---|---|---|---|
| GB | 2264474 | A | 9/1993 |
| GB | 2266084 | A | 10/1993 |

* cited by examiner

REMOVABLE GOOSENECK HITCH BALL

CROSS-REFERENCE TO RELATED APPLICATION(S)

The present application claims priority from U.S. Provisional Application No. 63/331,986 entitled REMOVABLE GOOSENECK HITCH BALL filed Apr. 18, 2022, incorporated herein by reference.

BACKGROUND

The present invention relates to gooseneck hitch balls which are removable from a vertical socket in the bed of the towing vehicle. Removable gooseneck hitch balls are known, such as disclosed in U.S. Pat. Nos. 5,016,898 and 6,969,090, both incorporated by reference. In general, the gooseneck hitch ball is purchased with a base or shank which matches and mates with the specific shape of the socket of the hitch: CURT Manufacturing of Eau Claire, Wisconsin has for several years sold a line of removable gooseneck hitches with a socket and base/shank which are circular in horizontal cross-section, secured with two pins through the base/shank, whereas B&W Trailer Hitches of Humboldt, Kansas has for several years sold a line of removable gooseneck hitches with a socket and base/shank which is square in horizontal cross-section, secured with a single pin through the base/shank.

More recently, improvements have been devised which allow relative movement between a hitch ball and its base/shank, as disclosed in U.S. Pat. No. 11,192,408, incorporated by reference. The hitches of U.S. Pat. No. 11,192,408 include a compressible insert placed within the structure to compressibly resist the relative movement.

BRIEF SUMMARY OF THE INVENTION

The present invention is a removable gooseneck hitch ball, with a hitch ball extending over a neck and supported by a shank. The shank has a unique shape enabling it to be received in different gooseneck hitch ball sockets of different shapes. In particular, the shank has a contact surface extending around its central axis for making contact with the socket. The contact surface includes a plurality of arc surfaces and a plurality of flat surfaces. The plurality of arc surfaces collectively define a cylinder centered on the central axis. Each of the flat surfaces is parallel to the central axis and inside the cylinder defined by the arc surfaces. By having this unique shape, the shank can be matingly received in a cylindrical socket of the towing vehicle with the arc surfaces in contact with the cylindrical socket or can be matingly received in a prism shaped socket with the flat surfaces in contact with the prism shaped socket.

Figure 1:
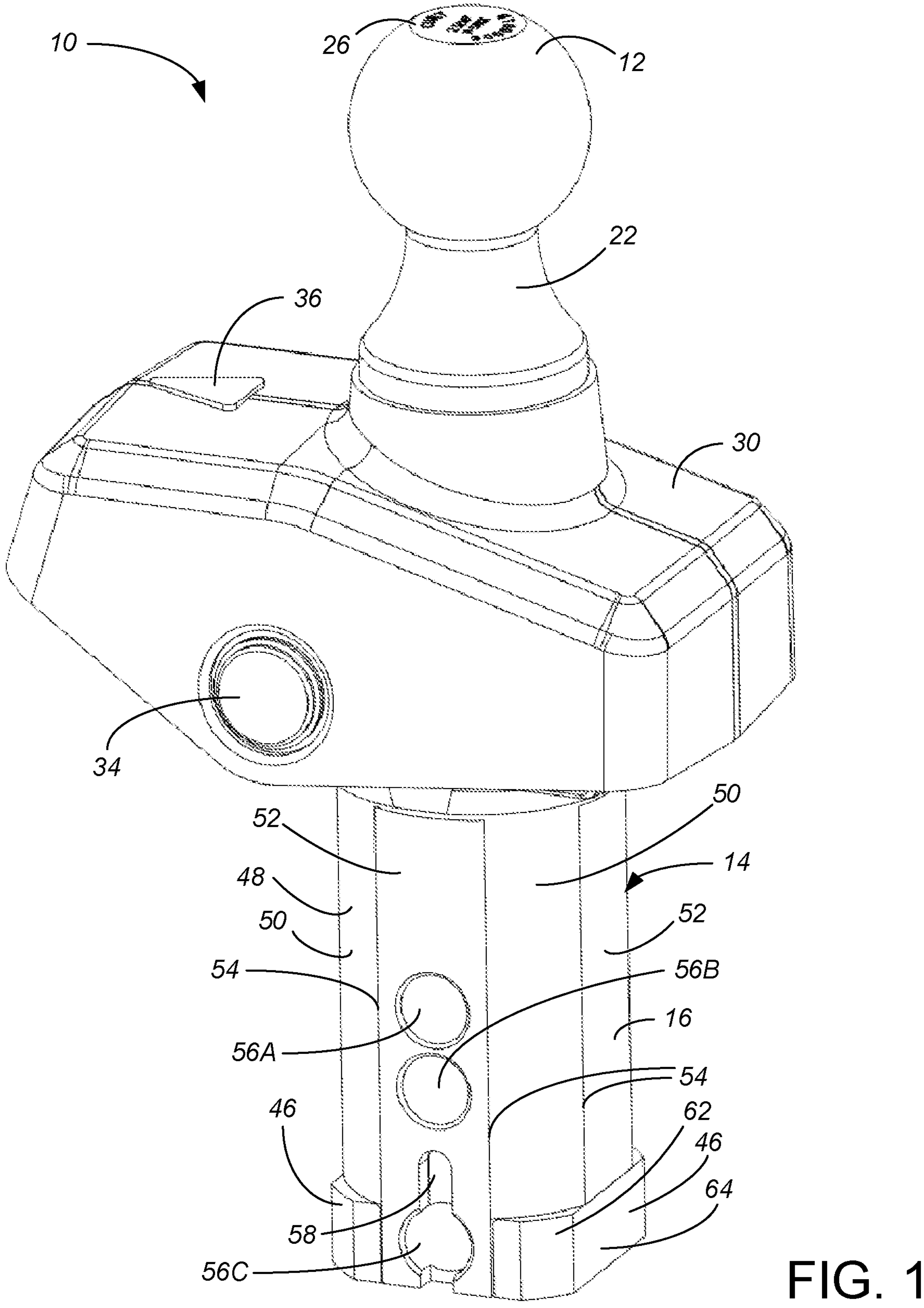
FIG. 1 is a rear left perspective view of a preferred removable gooseneck hitch ball in accordance with the present invention, with the adaptors attached.
Figure 2:
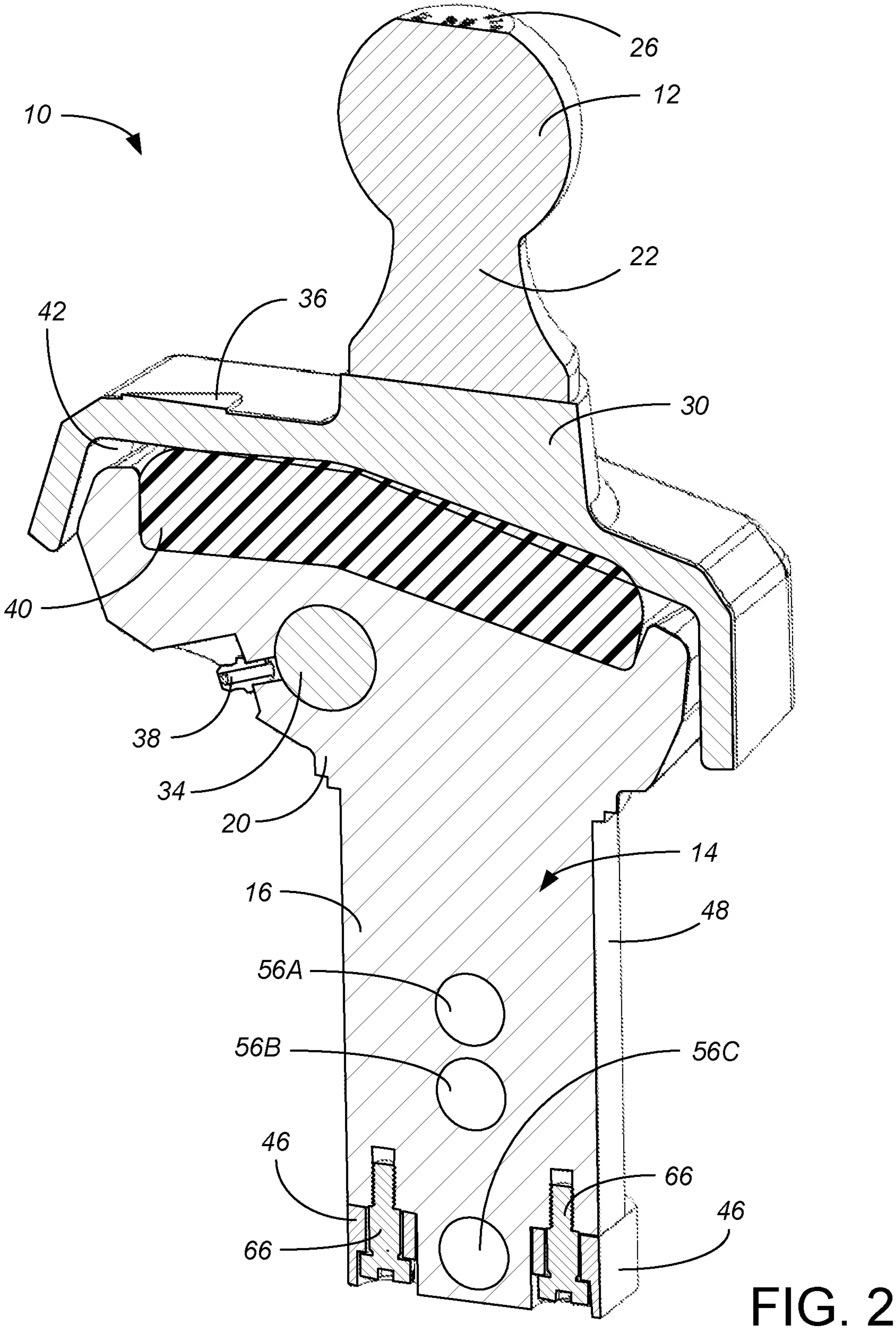
FIG. 2 is a cross-sectional view of the removable gooseneck hitch ball of FIG. 1, taken along a longitudinal center line.
Figure 3:
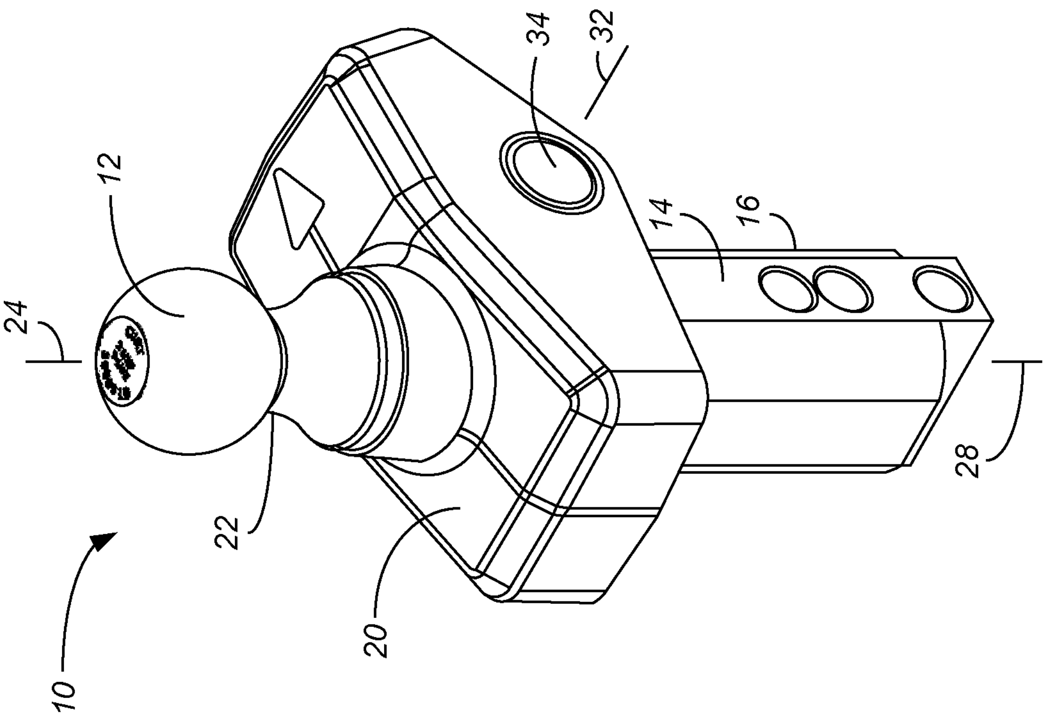
FIG. 3 is a rear right perspective view of the removable gooseneck hitch ball of FIGS. 1 and 2 without having the adaptors attached.

While the above-identified drawing figures set a forth preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

A preferred embodiment of a removable gooseneck hitch ball 10 is shown in FIGS. 1-5, and includes a hitch ball member 12 mounted above a base/shank 14. The shank 16 is considered the part of the base/shank 14 that resides within most sockets 18A, 18B with which removable gooseneck hitch ball 10 will be used, whereas the base 20 is considered the part of the base/shank 14 that will be above the truck bed for most gooseneck towing arrangements.

Figure 33:
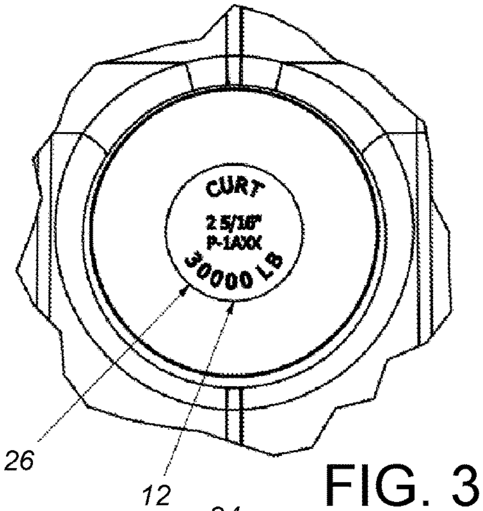
FIG. 33 is an enlarged detail view of an area of FIG. 31 designated by line 33 in FIG. 31.
Figure 30:
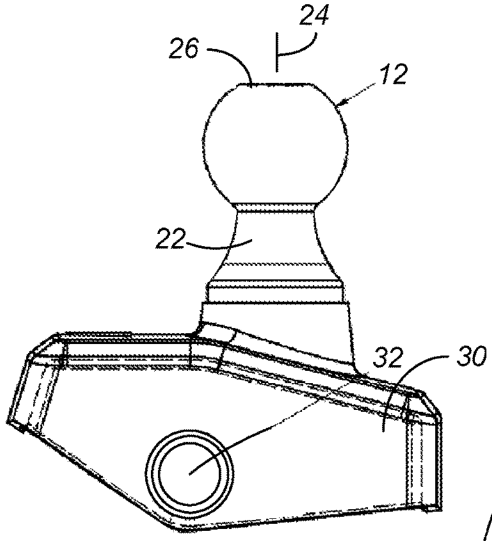
FIG. 30 is a left side elevational view of the pivot ball of FIG. 29.
Figure 29:
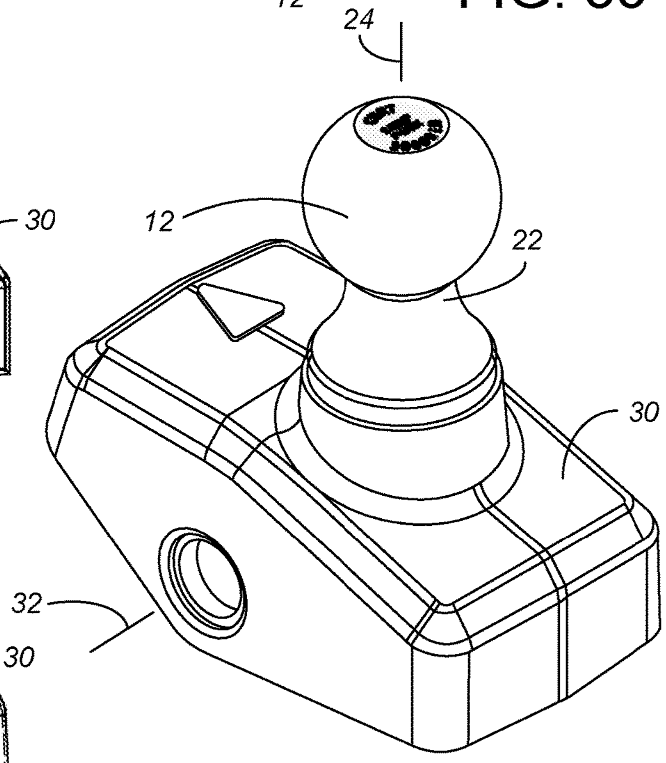
FIG. 29 is a rear left perspective view of the pivot ball of the removable gooseneck hitch ball of FIGS. 1-18.
Figure 32:
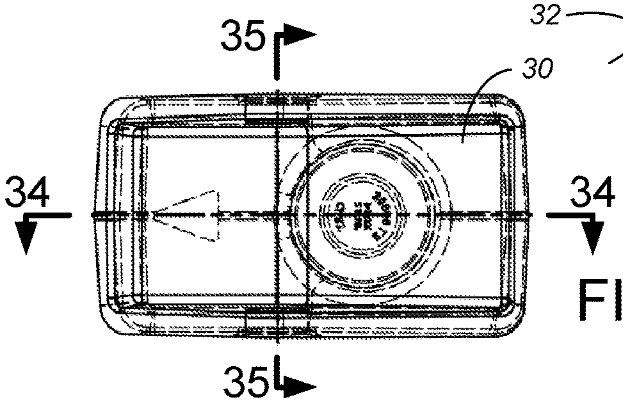
FIG. 32 is a bottom plan view of the pivot ball of FIGS. 29-31.
Figure 35:
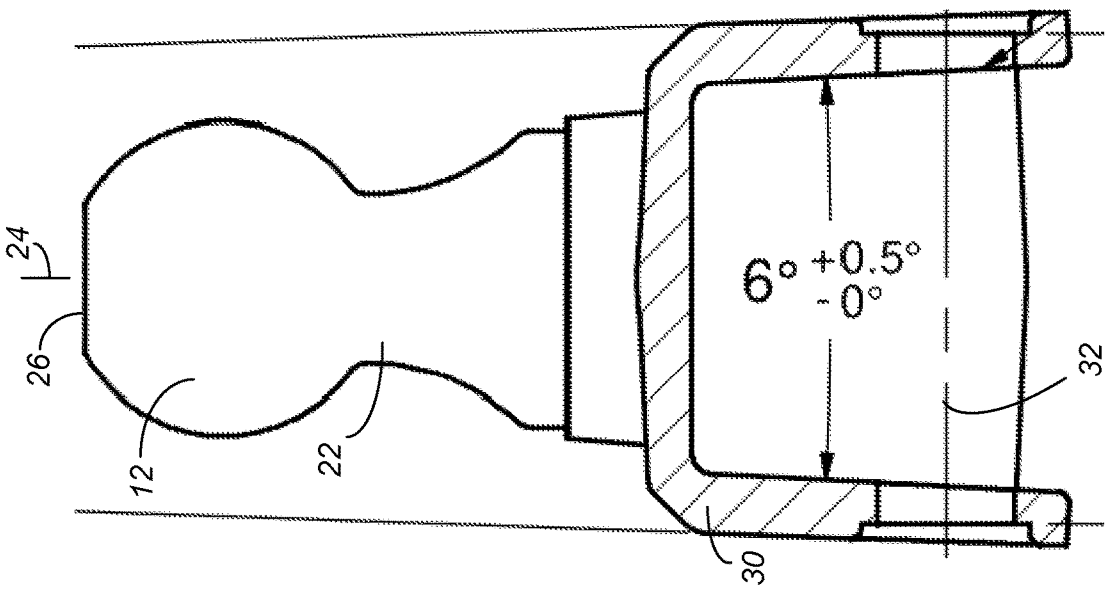
FIG. 35 is a vertical cross-sectional view of the pivot ball of FIGS. 29-32, taken along the transverse cut line 35-35 in FIG. 32.
Figure 34:
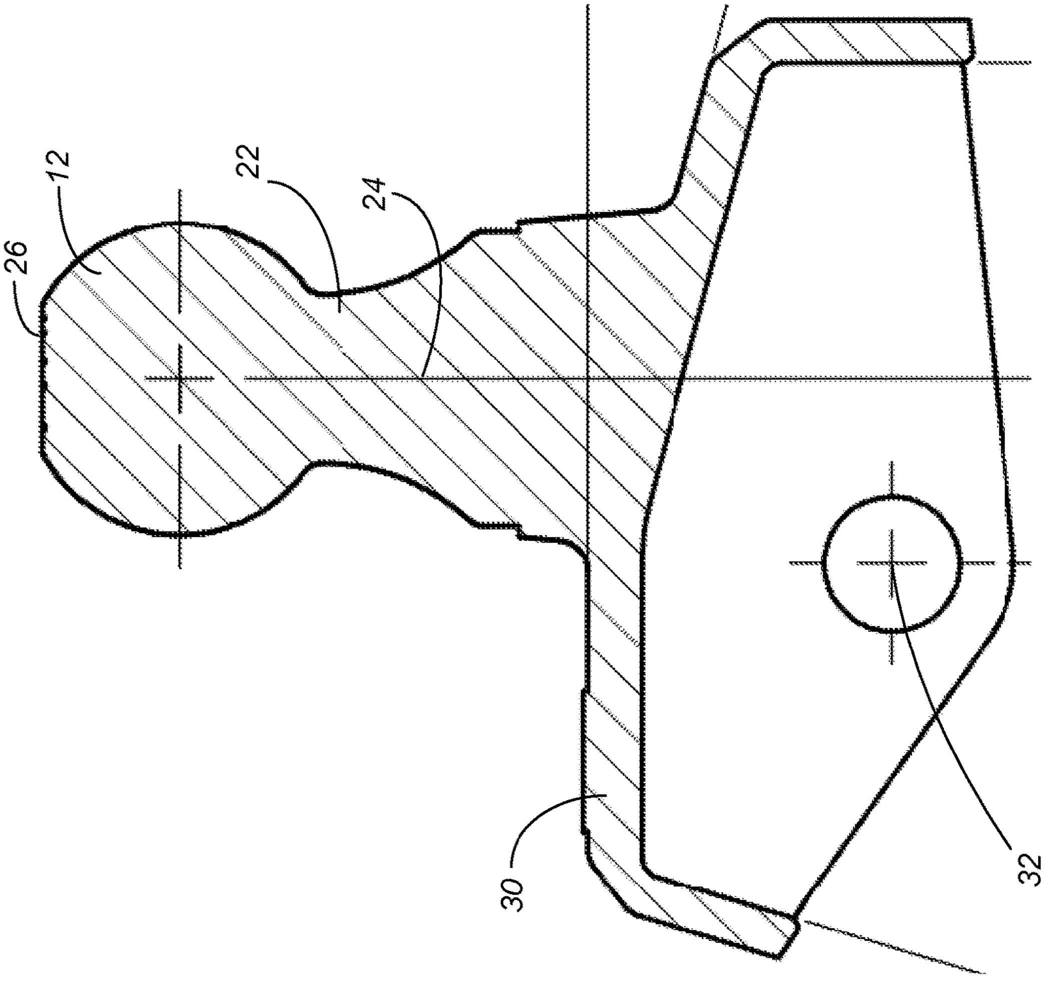
FIG. 34 is a vertical cross-sectional view of the pivot ball of FIGS. 29-32, taken along the longitudinal center cut line 34-34 in FIG. 32.
Figure 36:
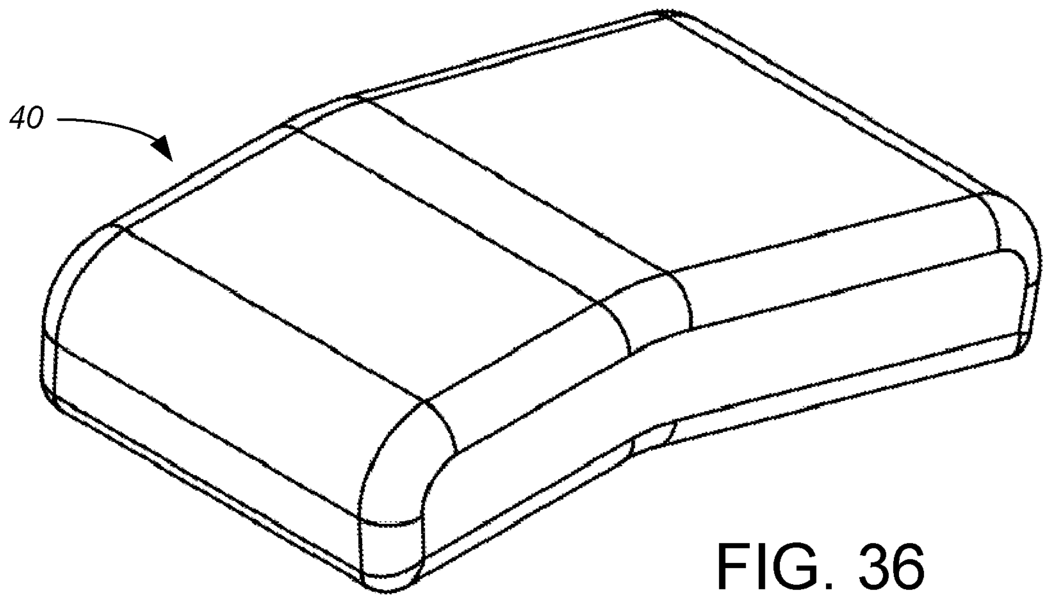
FIG. 36 is a front left perspective view of the compressible insert of the removable gooseneck hitch ball of FIGS. 1-18.
Figure 37:
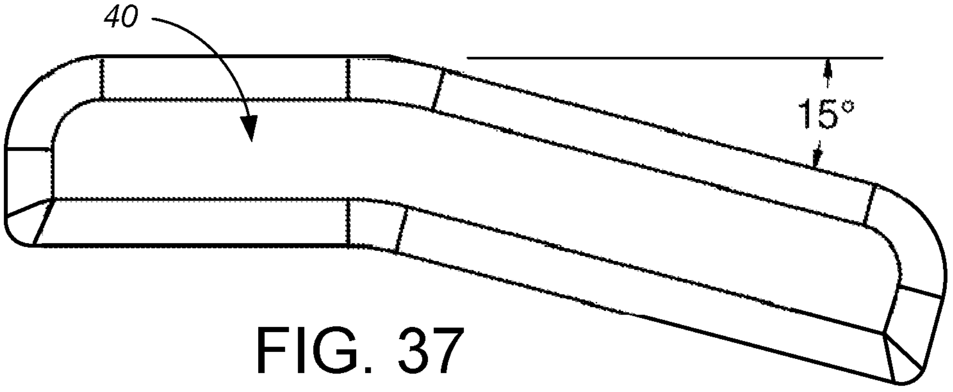
FIG. 37 is a left side elevational view of the compressible insert of FIG. 36.
Figure 38:
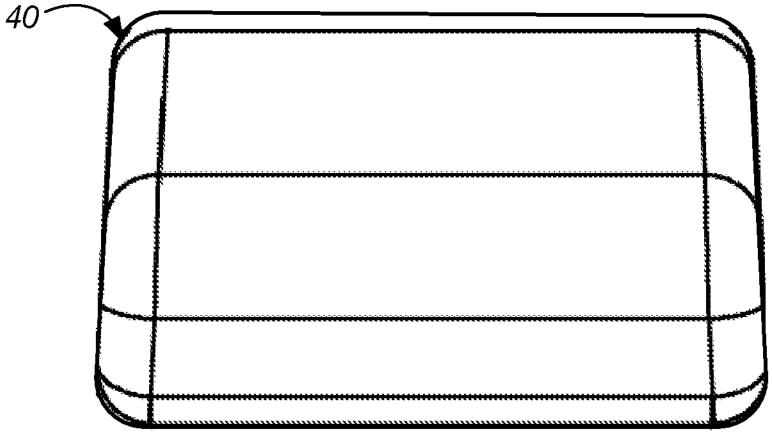
FIG. 38 is a rear elevational view of the compressible insert of FIGS. 36 and 37.
Figures 39, 40, 41, 42, 43:
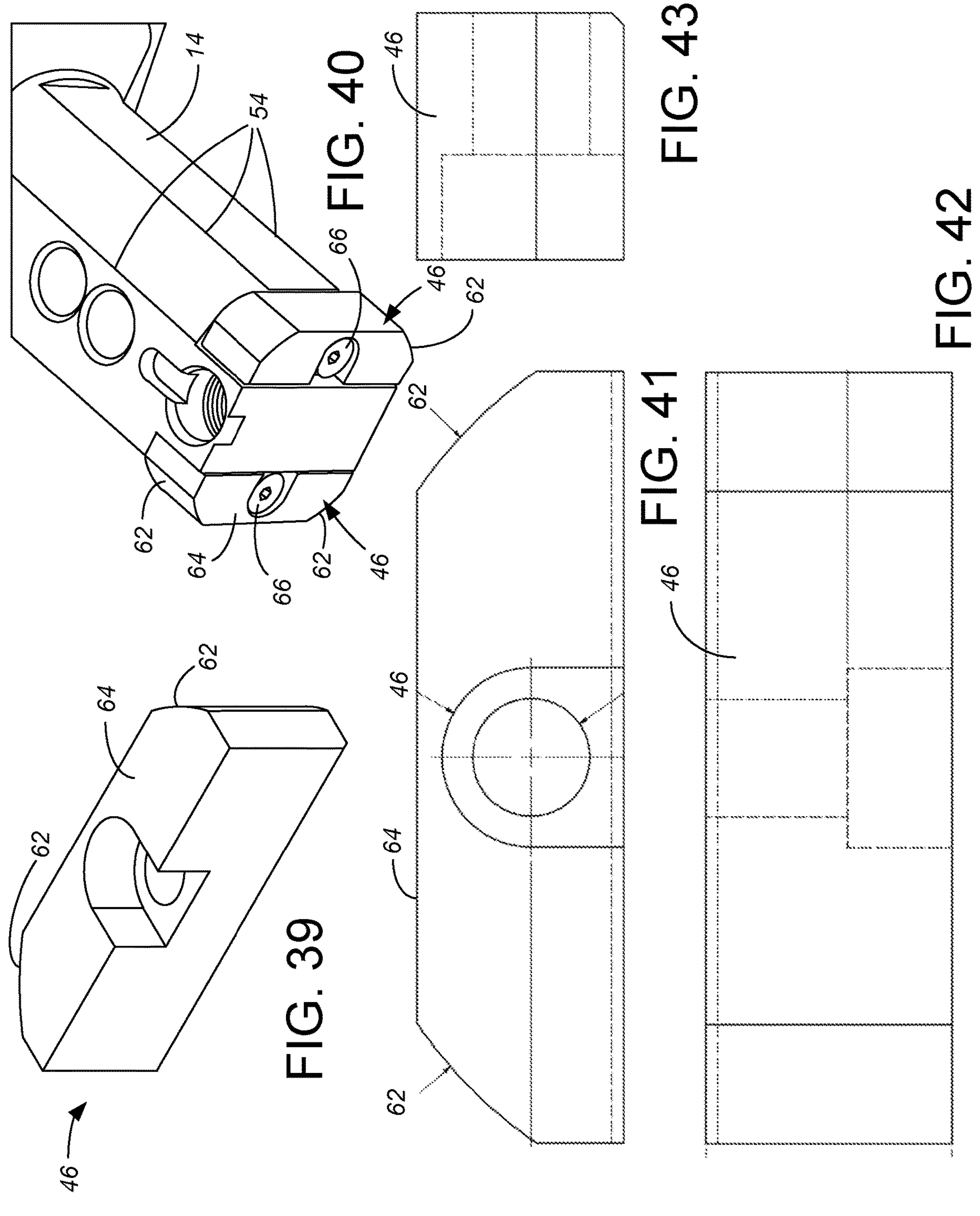
FIG. 39 is a perspective view of the adaptor of the removable gooseneck hitch ball for use with the B&W socket as shown in FIGS. 15 and 18.
FIG. 40 is a perspective view showing attachment of the adaptor to the shank of the removable gooseneck hitch ball.
FIG. 41 is a bottom plan view of the adaptor of FIGS. 39 and 40.
FIG. 42 is a side view of the adaptor of FIGS. 39-41.
FIG. 43 is an end view of the adaptor of FIGS. 39-42.

The ball 12 extends above a neck 22, which jointly define a generally vertical towing pivot axis 24, i.e., intended to be vertical when the towing vehicle (not shown) is on level ground, but the orientation of which will obviously change as the towing vehicle traverses over hills, troughs, slopes, etc. The ball 12 is received in a towed vehicle or trailer coupler (not shown) as known in the art, with the trailer coupler pivoting about the towing pivot axis 24 during turns of the towing vehicle. The ball 12 generally has a spherical outer profile, in which various portions of the ball 12 may be recessed relative to the sphere defined by the ball 12, and in which use and impacts may dent or otherwise deform that ball 12 so as to not be entirely spherical. For instance, the preferred ball 12 has a flat top 26, embossed with information such as the manufacturer, ball size and rated towing load as best shown in FIG. 33.

The shank 16 defines a central axis 28 which defines the insertion direction of the shank 16 into the towing socket 18A, 18B, which in the preferred embodiment extends vertically and coincident with the towing pivot axis 24. In other embodiments for use with sockets which are not perpendicular to the bed of the towing vehicle, the central axis may not be vertical. Similarly, in other embodiments the central axis 28 of the shank 16 may be in front, behind or to the side of the towing pivot axis 24, for use in towing vehicles where mounting arrangements or other components lead to placement of the socket offset from the desired towing pivot axis 24.

Figure 5:
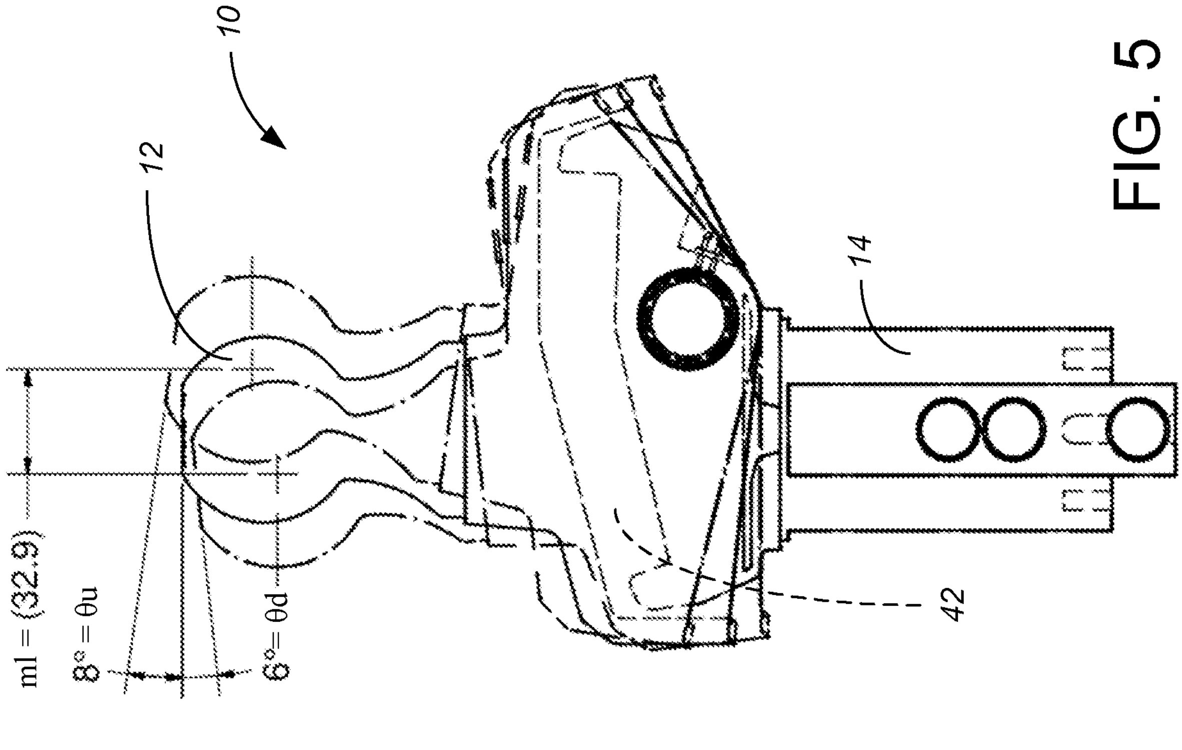
FIG. 5 is a side view of the removable gooseneck hitch ball of FIGS. 1-4, showing the preferred range of motion of the hitch ball.
Figure 4:
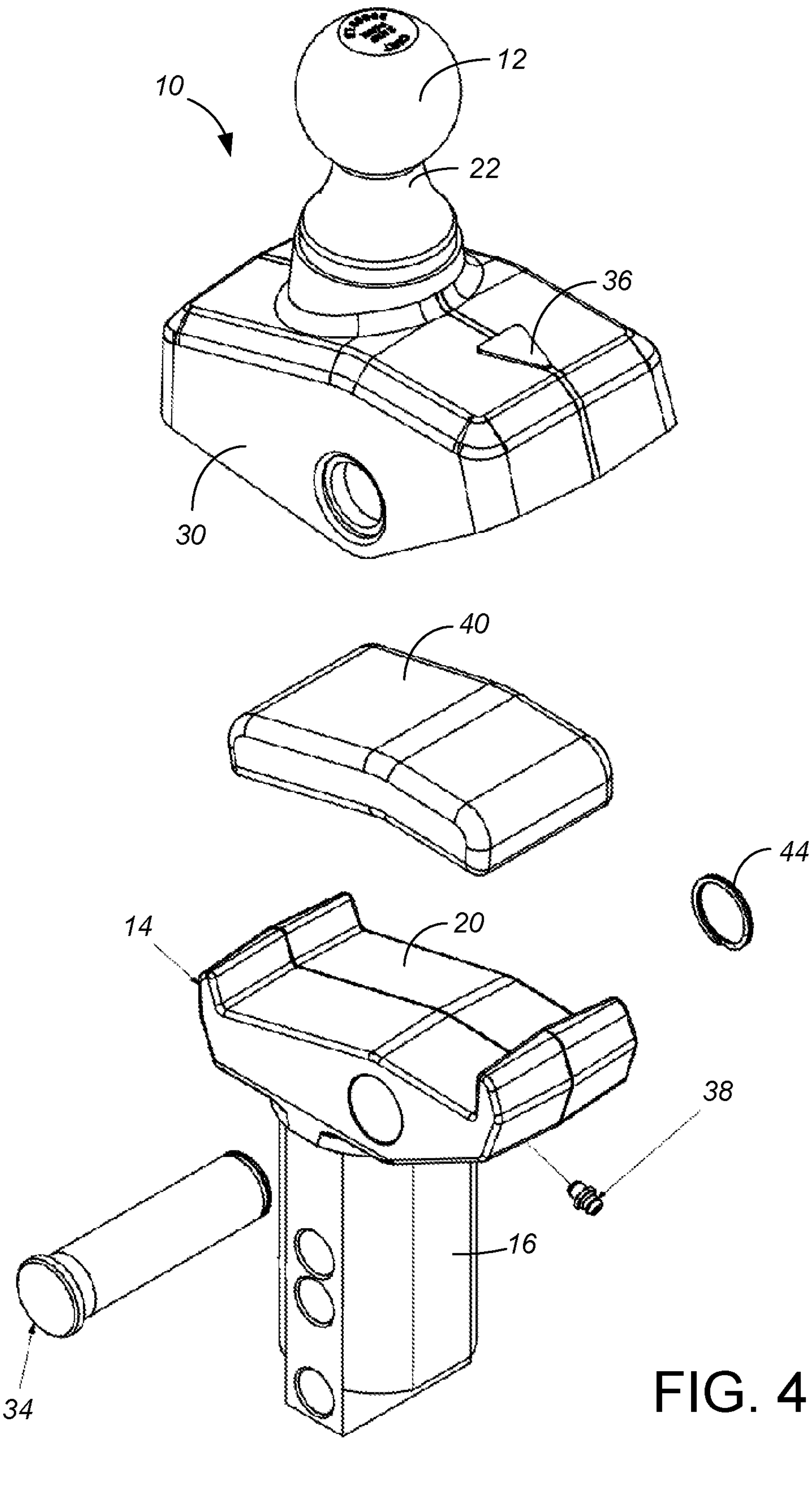
FIG. 4 is a front right exploded perspective view of the removable gooseneck hitch ball of FIGS. 1-3, but not showing the adaptors.
Figure 6:
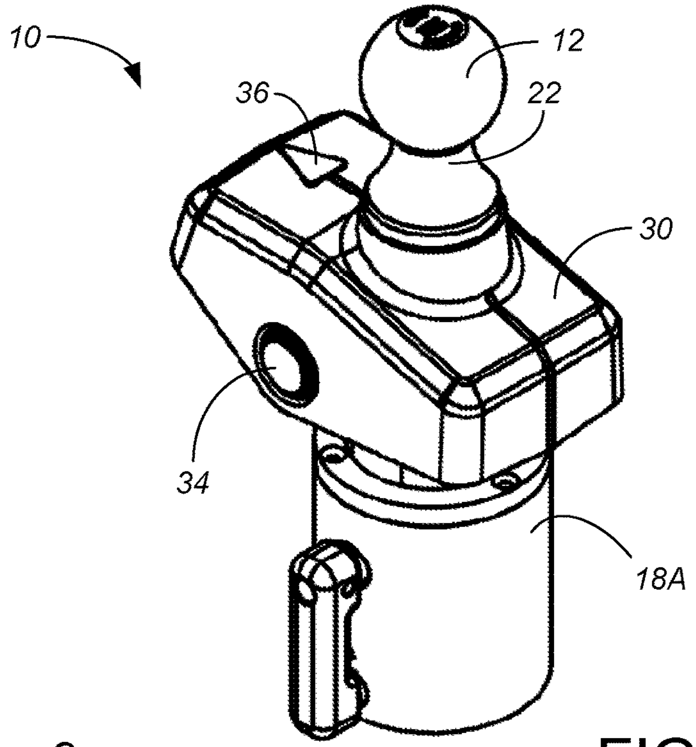
FIG. 6 is a rear left perspective view of the removable gooseneck hitch ball of FIGS. 1-5, shown within a CURT socket.
Figure 7:
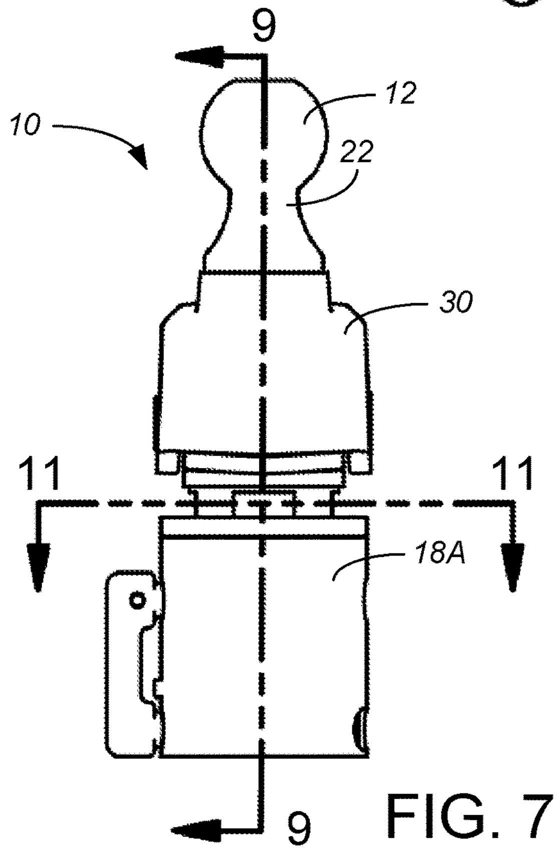
FIG. 7 is a rear elevational view of the removable gooseneck hitch ball of FIGS. 1-6 shown within the CURT socket.
Figure 8:
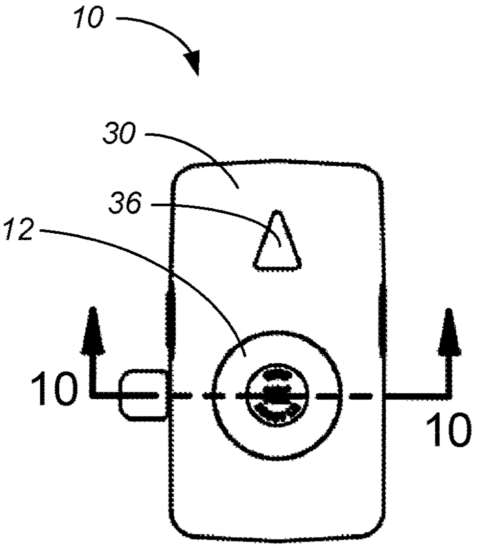
FIG. 8 is a top plan view of the removable gooseneck hitch ball of FIGS. 1-7 within the CURT socket (socket is hidden beneath the removable gooseneck hitch ball).
Figure 9:
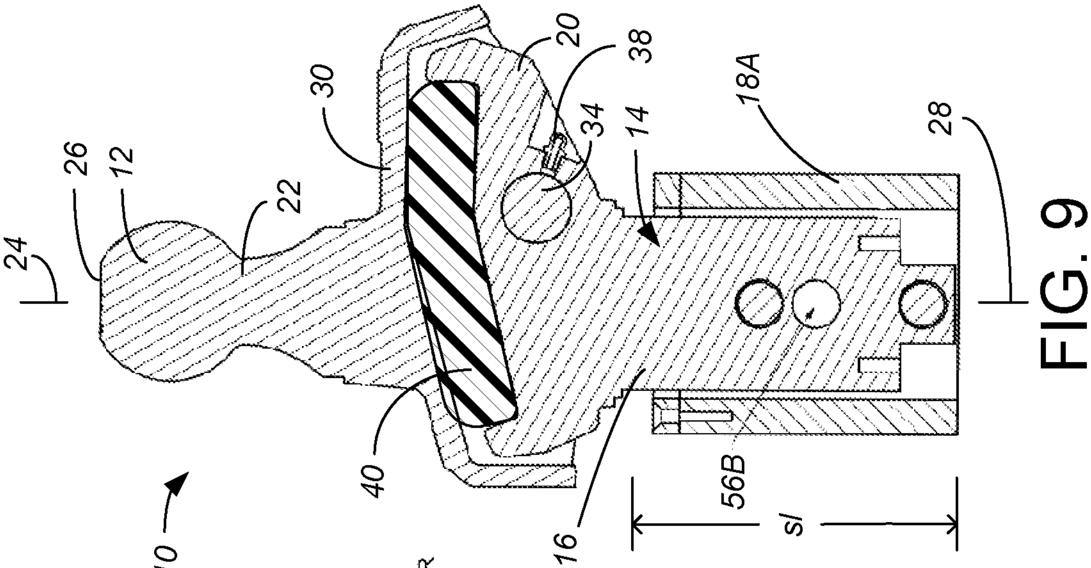
FIG. 9 is a side cross-sectional view of the removable gooseneck hitch ball of FIGS. 1-8 within the CURT socket, taken along the longitudinal center cut line 9-9 in FIG. 7, and showing the compressible insert at its uncompressed thickness.

The preferred embodiment fixes the ball 12 on a pivoting head 30 as taught in U.S. Pat. No. 11,192,408, incorporated by reference. For instance, the ball 12 can be separately formed by machining and then welded to a cast head 30. In this embodiment, the pivot axis 32 for the head 30 is defined by a pivot pin 34, located in front of the towing pivot axis 24 and the shank central axis 28. To assist users in correctly orienting the removable gooseneck hitch ball 10 when installed into the socket 18A, 18B of the towing vehicle, the head 30 includes an arrow 36 which when installed points toward the front of the towing vehicle. A grease zerk 38 is included to lubricate the pivoting motion of the head 30 relative to the base 20. A compressible insert 40 is placed into a pocket 42 defined between the base 20 and the head 30. The compressible insert 40 is made of a polymer material which can compress significantly more than the metal material of the base 20 and the head 30. For instance, the compressible insert 40 can be about one inch thick and formed of durometer Shore 95-100A polyurethane, while the base 20 and the head 30 are formed of 5140 steel heat treated to 24-28 Rockwell C. In the preferred embodiment as shown in FIG. 5, the potential pivoting motion of the center of the ball 12 relative to the shank 16 allowed by compression of the compressible insert 40 from the fully forward to the fully rearward position generates a movement in the longitudinal direction ml of about 32.9 mm, changing the angle of the ball 12 by an angle θu of up to 8° upward/forward from its resting point or by an angle θd of up to 6° downward/rearward from its resting point. During assembly of the head 30 to the base 20 around the compressible insert 40, the pivot pin 34 can be held by a retaining ring 44. Other embodiments fix the ball relative to the shank.

The shape of the shank 16 allows the removable gooseneck hitch ball 10 to be retrofit and used with existing gooseneck hitch sockets in the field, including with both the most common socket 18A of CURT and the most common socket 18B of B&W. FIGS. 6-11 show the removable gooseneck hitch ball 10 (without the adaptors 46) within the most common CURT socket 18A, and FIGS. 12-18 show the removable gooseneck hitch ball 10 (with the adaptors 46) within the most common B&W socket 18B. FIGS. 19-43 show various views and cross-sections of the primary component parts. In particular, the shank 16 has a contact surface 48 extending around the central axis 28, which includes a plurality of arc surfaces 50 and a plurality of flat surfaces 52. The plurality of arc surfaces 50 are not radiused corners, but instead collectively define a cylinder centered on the central axis 28. Each of the flat surfaces 52 is parallel to the central axis 28 and inside the cylinder defined by the arc surfaces 50. By having this shape, the shank 16 can be matingly received in a cylindrical socket 18A of the towing vehicle with the arc surfaces 50 in contact with the cylindrical socket 18A, or can be matingly received in a prism shaped socket 18B with the flat surfaces 52 in contact with the prism shaped socket 18B.

The preferred embodiment has four arc surfaces 50 and four flat surfaces 52, with the four flat surfaces 52 defining a square. The preferred cross-sectional shape can thus be referred to as a "squircle", combining a square and a circle. The intersecting edges between the arcs 50 and flats 52 define eight vertically extending edge lines 54 visible on the contact surface 48 of the shank 16; these eight vertically extending edge lines 54 will take the most load as the direction of the towing force changes during towing, as the vehicles accelerate and decelerate and proceed around corners. The squircle shape and size was chosen to correspond with a combination of the square (2.5×2.5 inches) cross-sectional shape of the common existing B&W shanks and the circle (2.75 inch diameter) cross-sectional shape of the common existing CURT shanks, with the eight edge lines 54 located at the eight intersection points when a 2.5×2.5 inch square is overlaid on a 2.75 inch diameter circle. The squircle shape should make significant contact with both square and circular sockets 18A, 18B, such as four contact areas (either 50 or 52) each having contact lengths of at least ½ inch circumferentially, and more preferably four contact areas (either 50 or 52) each having contact lengths of at least 0.8 inches circumferentially. The significant contact lengths help transfer the variable loads placed on the ball 12 during towing between the shank 16 and its socket 18A, 18B. The most preferred squircle shape includes four flats 52, each having a contact length of 28.5 mm when used with the common existing B&W socket 18B, as well as four arcs 50, each making a contact length of 25.1 mm when used with the common existing CURT socket 18A. Other embodiments could have the flats arranged in a rectangle with a different length and width rather than a square, allowing mating into a rectangular cross-sectioned socket (not shown). Similarly, other embodiments could have a different number of arcs and flats, such as having three flats arranged in a triangle, five flats arranged in a pentagon, or six flats arranged in a hexagon, for use with differently shaped sockets (not shown). The key aspect is that the shank 16 can mate into cylindrical sockets 18A or into prism shaped sockets 18B at the election of the user, in situations where just matching the size/shape of the cylindrical shape would not fit into the size of the prism shaped socket and just matching the size/shape of the prism shape would not fit into the size of the cylindrical socket. The characteristic shape of the shank 16 thus allows a single product to be used with more sockets than the prior art would allow.

The shank 16 needs to be long enough in the vertical direction both to withstand the towing moments placed on the ball 12 and to receive whatever securing structure is provided by the sockets 18A, 18B in which the removable gooseneck hitch ball 10 is used. For instance, the shank 16 should be at least 3 inches in length, with the preferred embodiment having a shank length sl of 121.7 mm. The preferred shank 16 has three transverse through-holes 56A, 56B, 56C, each 17.5 mm in diameter. As shown in FIGS. 6, 7, 9 and 10, the upper and lower through-holes 56A, 56C are used with the CURT receiver 18A, whereas the middle through-hole 56B is used with the B&W receiver 18B as shown in FIGS. 12, 13, 15 and 16. The through-holes 56A, 56B, 56C are positioned at the elevations determined by the receiver pin depths relative to the highest likely bed floor.

Figure 10:
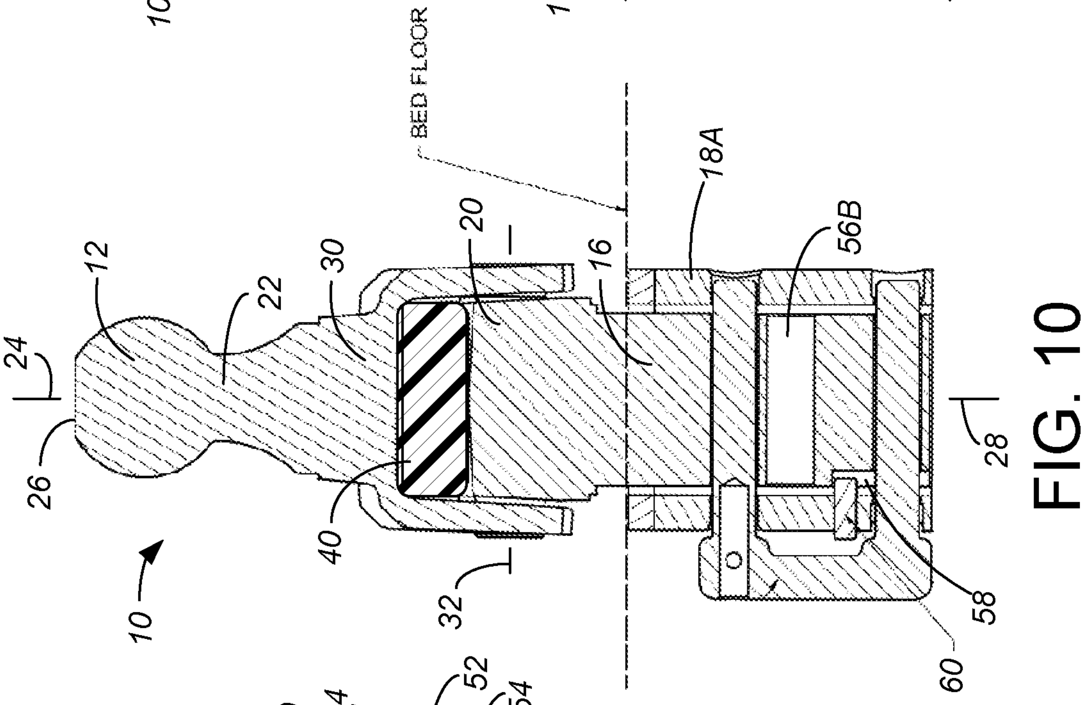
FIG. 10 is a rear cross-sectional view of the removable gooseneck hitch ball of FIGS. 1-9 within the CURT socket, taken along cut line 10-10 in FIG. 8.
Figure 11:
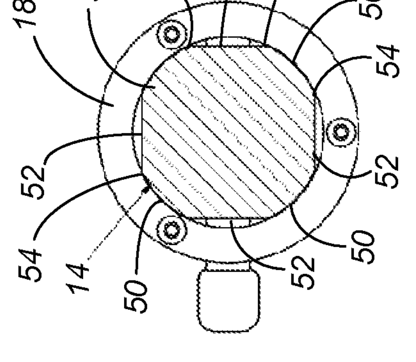
FIG. 11 is a horizontal cross-sectional view of the removable gooseneck hitch ball of FIGS. 1-10 taken along cut line 11-11 in FIG. 7, showing the top of the CURT socket.
Figure 12:
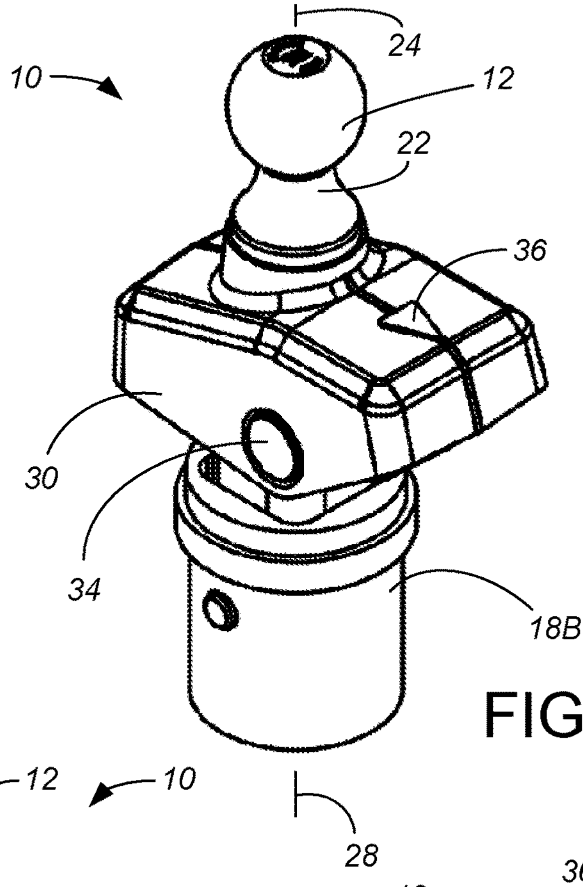
FIG. 12 is a front right perspective view of the removable gooseneck hitch ball of FIGS. 1-11, shown within a B&W socket.
Figure 13:
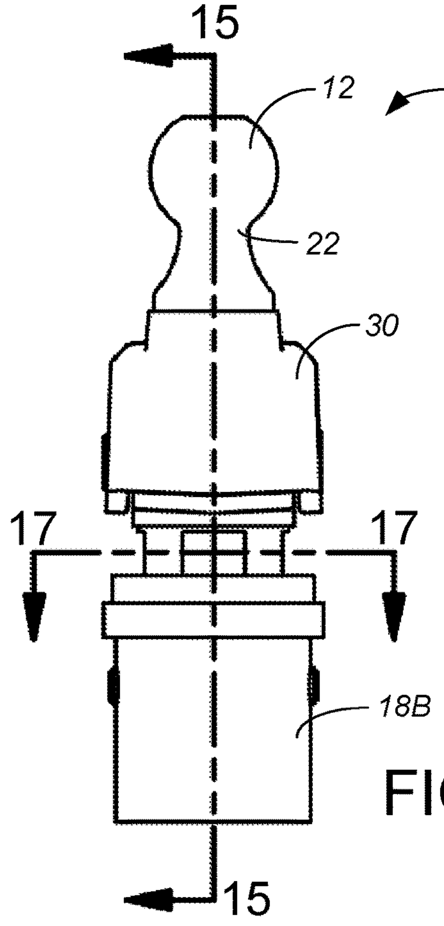
FIG. 13 is a rear elevational view of the removable gooseneck hitch ball of FIGS. 1-12 shown within the B&W socket.
Figure 14:
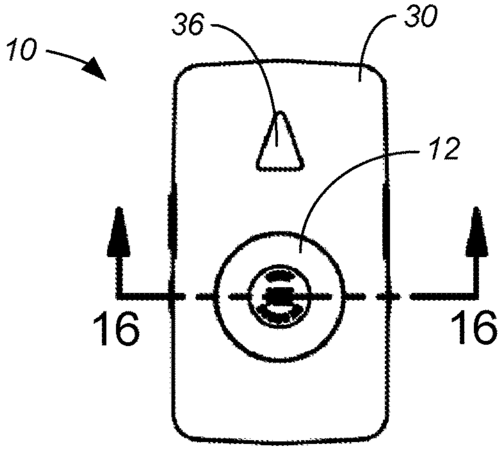
FIG. 14 is a top plan view of the removable gooseneck hitch ball of FIGS. 1-13 within the B&W socket (socket is hidden beneath the removable gooseneck hitch ball).
Figure 15:
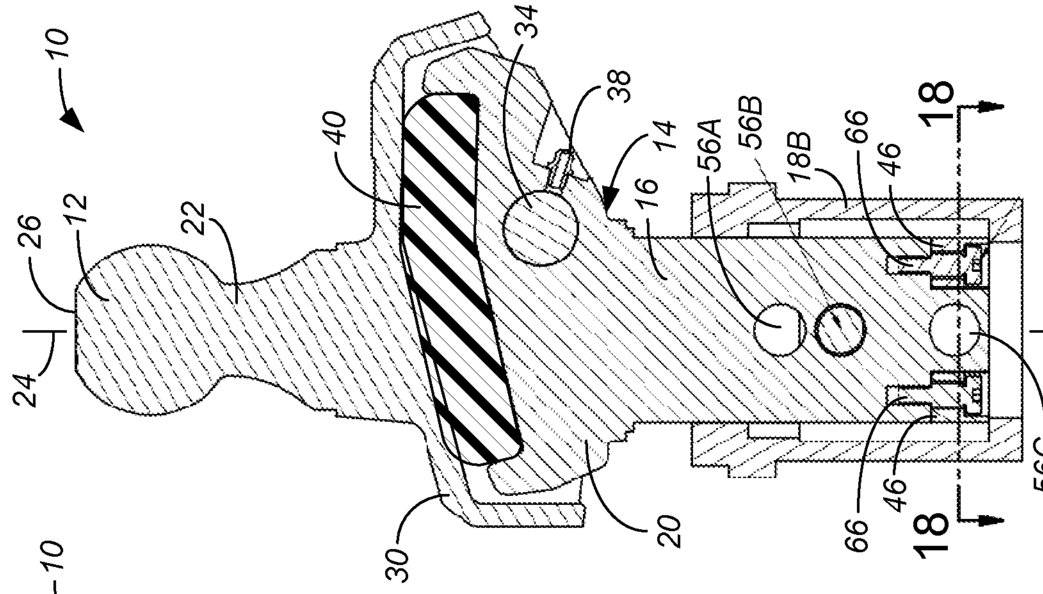
FIG. 15 is a side cross-sectional view of the removable gooseneck hitch ball of FIGS. 1-14 within the B&W socket, taken along the longitudinal center cut line 15-15 in FIG. 13, and showing the compressible insert at its uncompressed thickness.
Figure 16:
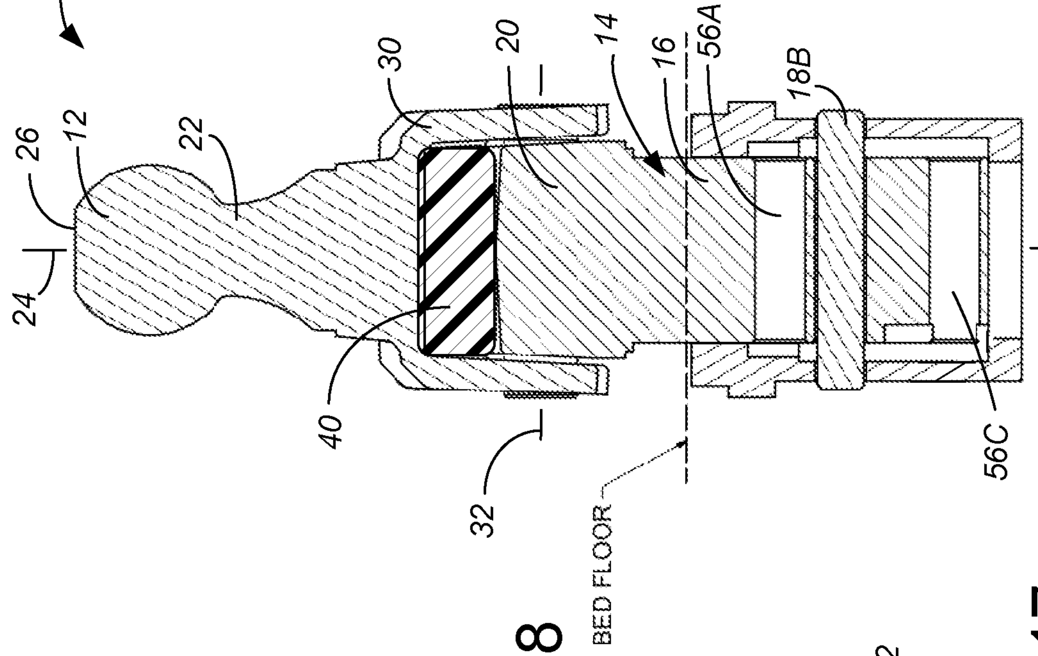
FIG. 16 is a rear cross-sectional view of the removable gooseneck hitch ball of FIGS. 1-15 within the B&W socket, taken along cut line 16-16 in FIG. 14.
Figure 18:
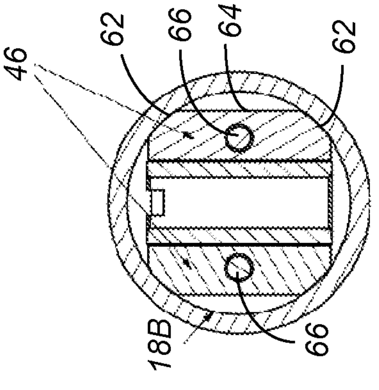
FIG. 18 is a horizontal cross-sectional view of the removable gooseneck hitch ball of FIGS. 1-17 within the B&W socket, taken along cut line 18-18 in FIG. 15.
Figure 17:
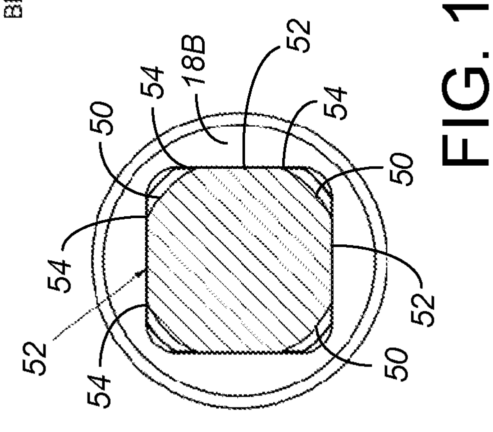
FIG. 17 is a horizontal cross-sectional view of the removable gooseneck hitch ball of FIGS. 1-16 taken along cut line 17-17 in FIG. 13, showing the top of the B&W socket.
Figure 19:
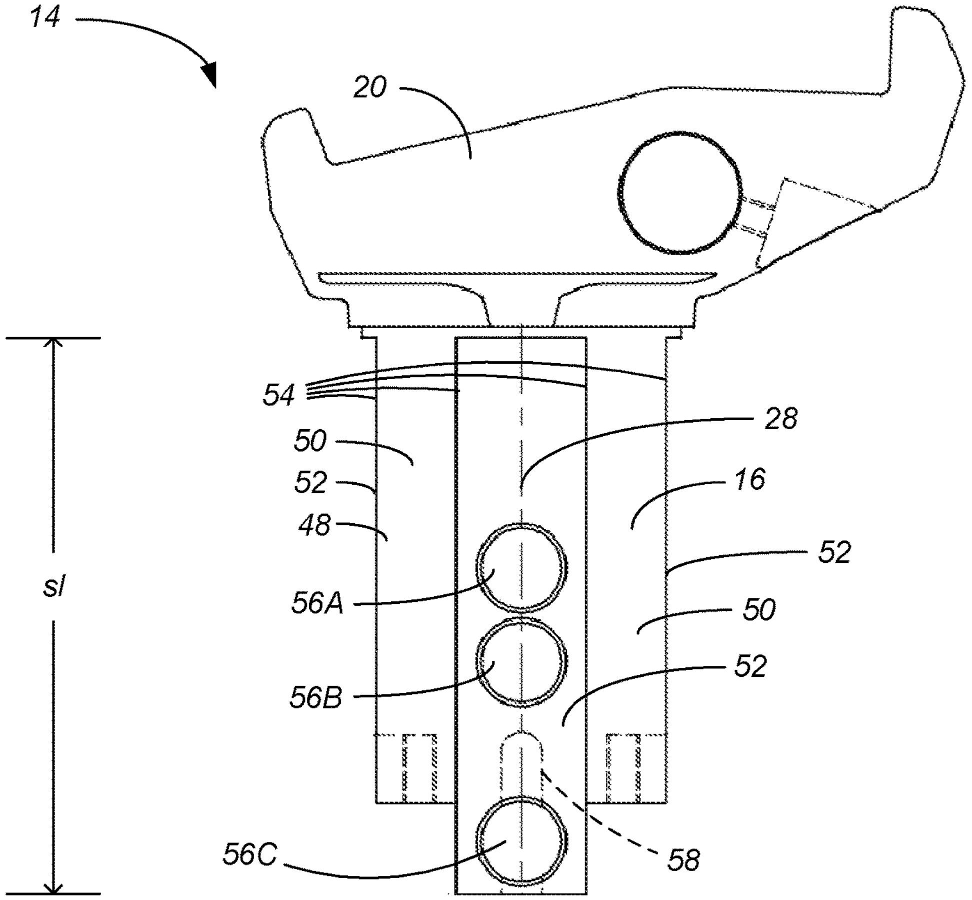
FIG. 19 is a right side elevational view of the base/shank of the removable gooseneck hitch ball of FIGS. 1-18, shown without radiused edge lines.
Figure 20:
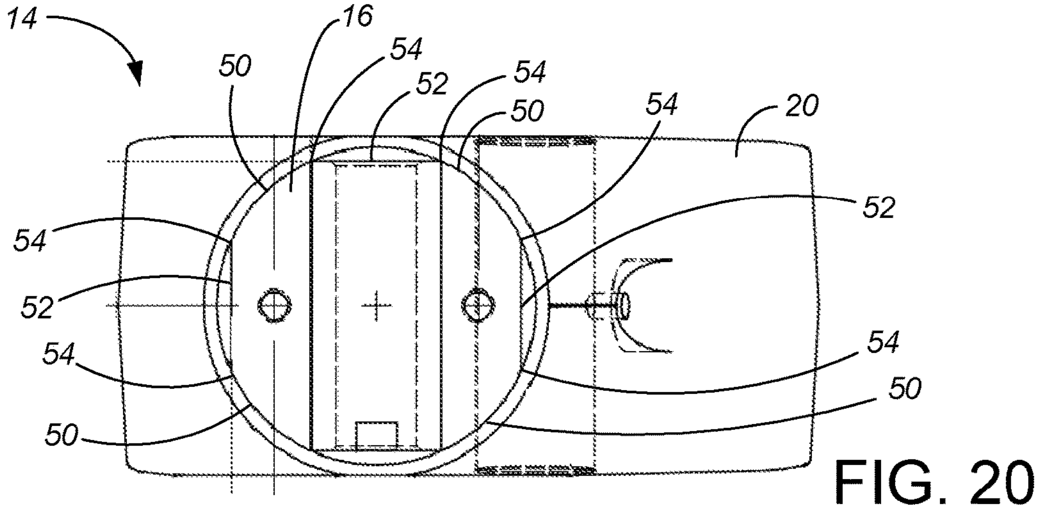
FIG. 20 is a bottom view of the base/shank of FIG. 19.
Figure 21:
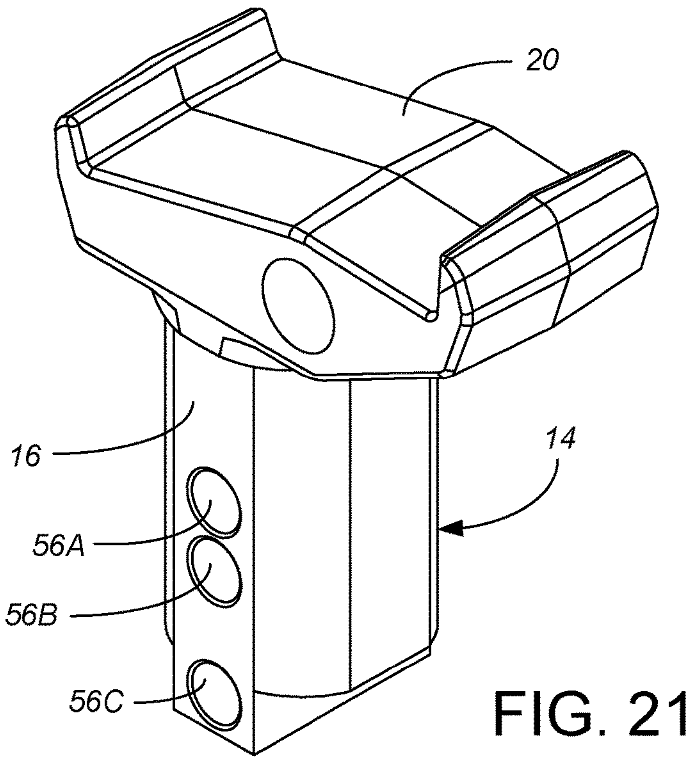
FIG. 21 is a front right perspective view of the base/shank of FIGS. 19 and 20.
Figure 23:
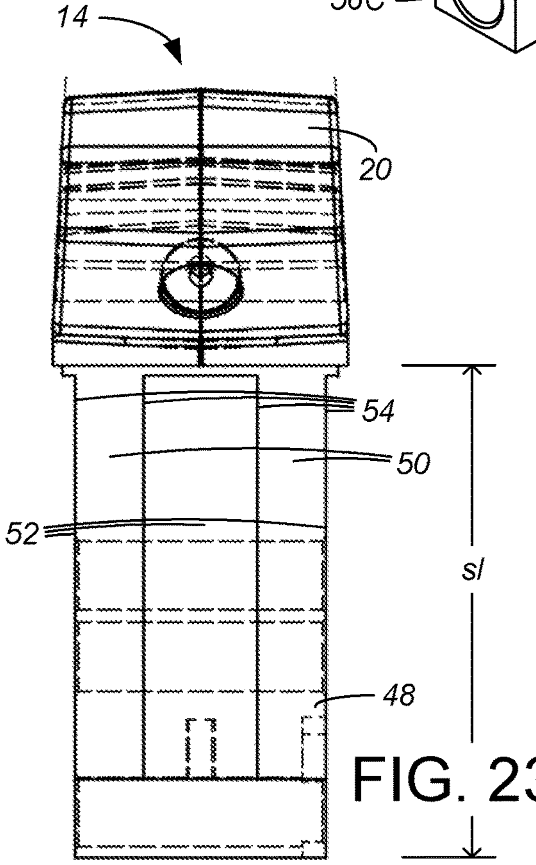
FIG. 23 is a front view of the base/shank of FIGS. 19-22.
Figure 22:
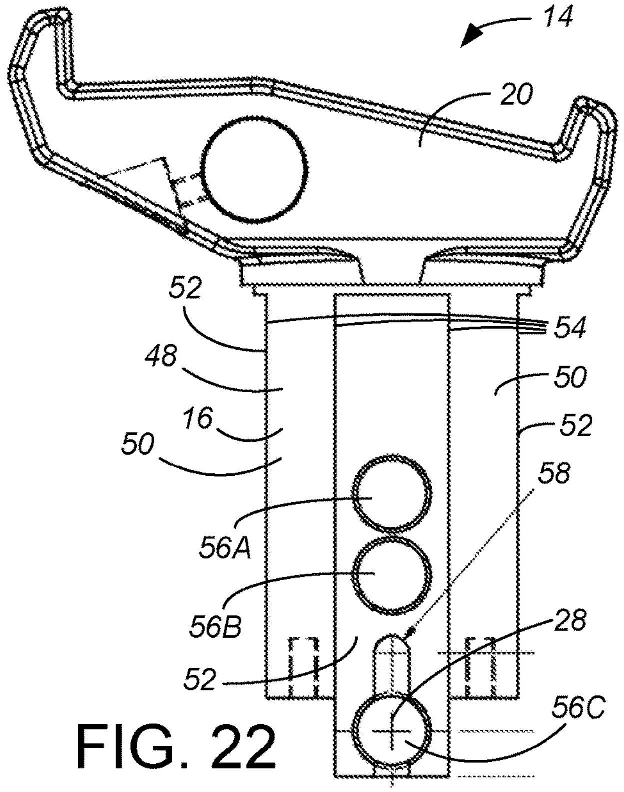
FIG. 22 is a left side elevational view of the base/shank of FIGS. 19-21, shown with radiused edge lines.
Figure 25:
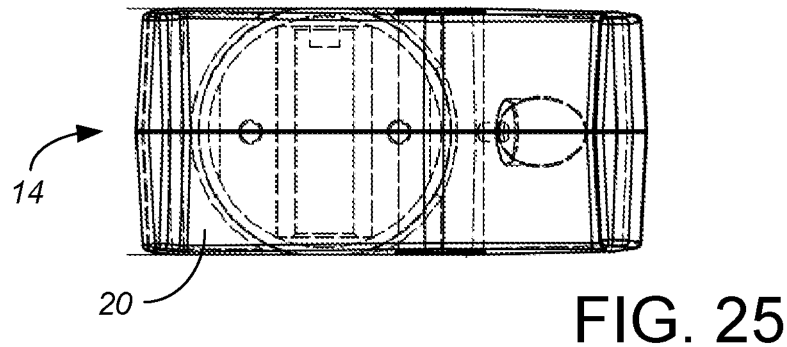
FIG. 25 is a top plan view of the base/shank of FIGS. 19-24.
Figure 24:
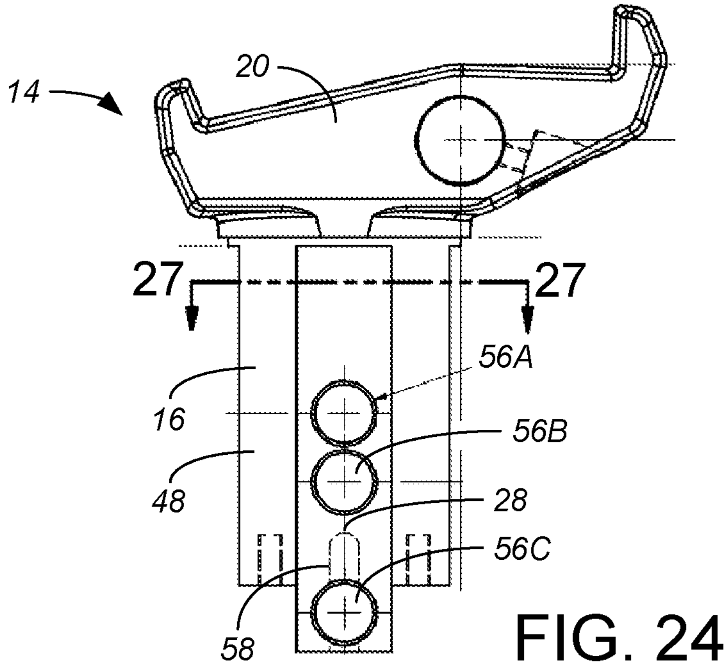
FIG. 24 is a right side elevational view of the base/shank of FIGS. 19-23.
Figure 26:
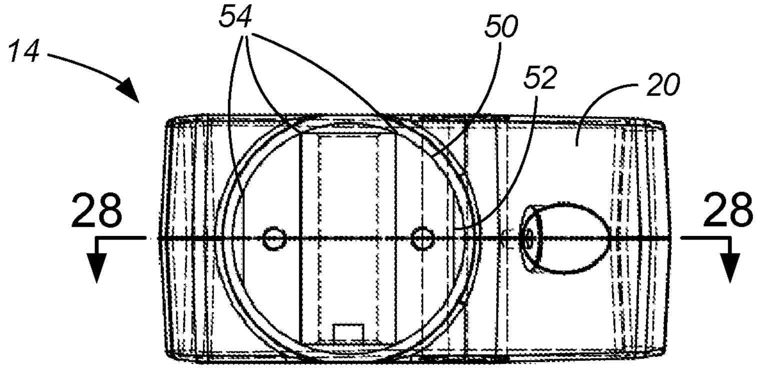
FIG. 26 is a bottom plan view of the base/shank of FIGS. 19-25.
Figure 27:
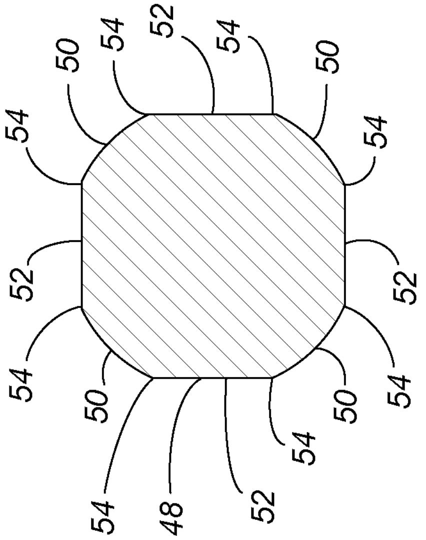
FIG. 27 is a horizontal cross-sectional view of the base/shank of FIGS. 19-26, taken along cut lines 27-27 in FIG. 24.
Figure 28:
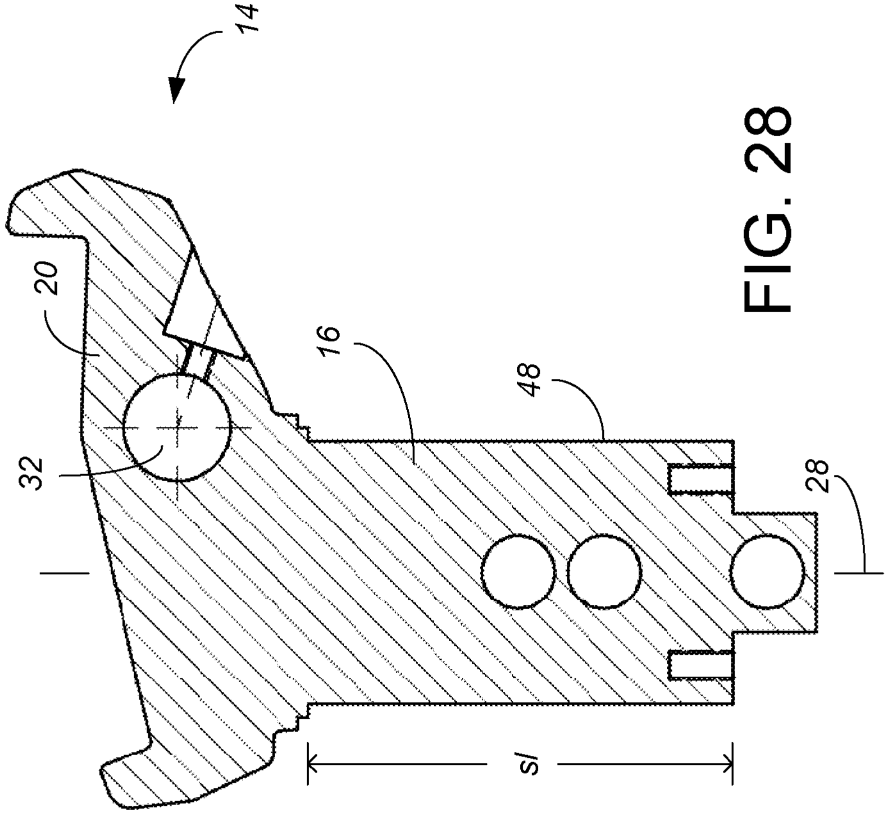
FIG. 28 is a vertical cross-sectional view of the base/shank of FIGS. 19-27, taken along the longitudinal center cut line 28-28 in FIG. 26.
Figure 31:
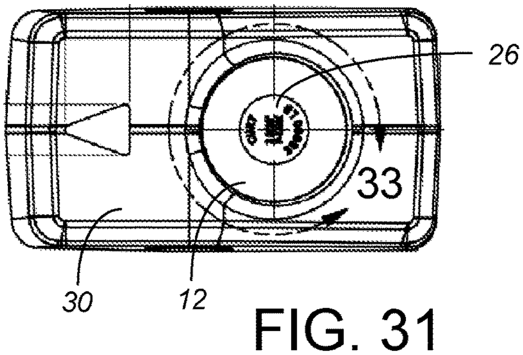
FIG. 31 is a top plan view of the pivot ball of FIGS. 29 and 30.

On one side of the bottom through-hole 56C, an additional vertical recess 58 is provided. As shown in FIG. 10, the CURT receiver 18A includes a transversely extending pin 60 which is received in this vertical recess 58 and sets the depth of the base/shank 14 when inserted into the socket 18A.

The bottom of the shank 16 is configured for optionally adding a two-piece adaptor 46 shown in FIGS. 39-43. Each of the two adaptors 46 provides two adaptor arc surfaces 62 and an adaptor flat 64, such that the two adaptors 46 collectively define an adaptor cylinder centered on the central axis 28. The defined adaptor cylinder has a greater diameter than the diameter of the cylinder defined by the arc surfaces 50 of the shank 16. The adaptor flats 64 are coincident extensions of two of the flat surfaces 52 of the shank 16. This adaptor 46 is only needed when using in a B&W socket 18B, and is not used in the CURT socket 18A. The reason this adaptor 46 is needed is because the bottom of the B&W socket 18B has a circular cross-section of 3 inches in diameter (0.25 inches larger than the CURT circular cross-sectional diameter), and the basic squircle design left too much clearance and allowed the ball 12 to move excessively in the B&W receiver 18B. Each adaptor 46 is preferably attached using a single shoulder screw 66 such as having an allen wrench head, so as to be readily and quickly removable and mountable using a simple, common allen wrench tool (not shown). Other removable attachment structures for attaching the adaptors 46 to the shank 16 can alternatively be used. For instance, the adaptors could be longitudinally slidable into or onto dovetail shaped rails (not shown) while the removable gooseneck hitch ball 10 is outside the socket 18A, 18B, with the bottom side walls of the socket 18B then holding the adaptors to the shank 16 against lateral movement.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

What is claimed is:

1. A removable gooseneck hitch ball comprising:

a hitch ball having a generally spherical outer profile receivable in a coupler of a towed vehicle;

a neck extending downwardly from the hitch ball, the neck and the hitch ball defining a generally vertical towing pivot axis;

a shank extending downwardly from the neck, the shank defining a central axis with a contact surface of the shank extending around the central axis, wherein the contact surface includes a plurality of arc surfaces and a plurality of flat surfaces, the plurality of arc surfaces collectively defining a cylinder centered on the central axis, each of the flat surfaces being parallel to the central axis and inside the cylinder defined by the arc surfaces, such that the shank can be matingly received in a cylindrical socket of the towing vehicle with the arc surfaces in contact with the cylindrical socket or can be matingly received in a prism shaped socket of the towing vehicle with the flat surfaces in contact with the prism shaped socket; and two adaptors removably attachable on a bottom of the shank, wherein each of the two adaptors provide two adaptor arc surfaces and an adaptor flat, such that the two adaptors collectively define an adaptor cylinder centered on the central axis, the adaptor cylinder having a greater diameter than the diameter of the cylinder defined by the arc surfaces of the shank.

2. The removable gooseneck hitch ball of claim 1, wherein the flat surfaces collectively define a rectangular prism.

3. The removable gooseneck hitch ball of claim 2, wherein the flat surfaces collectively define a square prism.

4. The removable gooseneck hitch ball of claim 3, wherein the flat surfaces each have contact lengths of at least ½ inch circumferentially.

5. The removable gooseneck hitch ball of claim 4, wherein the arc surfaces each have contact lengths of at least ½ inch circumferentially.

6. The removable gooseneck hitch ball of claim 5, wherein the flat surfaces each have contact lengths of at least 0.8 inches circumferentially.

7. The removable gooseneck hitch ball of claim 6, wherein the arc surfaces each have contact lengths of at least 0.8 inches circumferentially.

8. The removable gooseneck hitch ball of claim 1, wherein the shank defines a first pin receiving through-hole extending transversely through the central axis.

9. The removable gooseneck hitch ball of claim 8, wherein the shank further defines second and third pin receiving through-holes extending transversely through the central axis, vertically spaced and parallel to the first pin receiving through-hole.

10. The removable gooseneck hitch ball of claim 1, wherein the shank further defines a vertically extending recess exposed on a bottom side of the shank which sets the depth of the shank when inserted into a socket.

11. The removable gooseneck hitch ball of claim 1, wherein the adaptor flats are coincident extensions of two of the flat surfaces of the shank.

12. The removable gooseneck hitch ball of claim 1, wherein the towing pivot axis is coincident with the central axis of the shank.

13. The removable gooseneck hitch ball of claim 1, wherein the hitch ball and neck are pivotally mounted relative to the shank, wherein the hitch ball, neck and shank are all formed of metal, and further comprising a compressible insert compressed when the hitch ball and neck pivot relative to the shank, the compressible insert being formed of a polymer material.

14. A removable gooseneck hitch ball comprising:

a hitch ball having a generally spherical outer profile receivable in a coupler of a towed vehicle;

a neck extending downwardly from the hitch ball, the neck and the hitch ball defining a generally vertical towing pivot axis;

a shank extending downwardly from the neck, the shank defining a central axis with a contact surface of the shank extending around the central axis, wherein the contact surface includes eight edge lines extending parallel to the central axis, the eight edge lines collectively defining both a square prism and a cylinder; and at least one adaptor removably attachable on a bottom of the shank, the at least one adaptor when attached to the shank being entirely within a footprint of the square prism and at least partially outside a footprint of the cylinder.

15. The removable gooseneck hitch ball of claim 14, wherein the at least one adaptor is two adaptors removably attachable on the bottom of the shank.

16. The removable gooseneck hitch ball of claim 15, wherein each of the two adaptors provide two adaptor arc surfaces and an adaptor flat, such that the two adaptors collectively define an adaptor cylinder centered on the central axis, the adaptor cylinder having a greater diameter than the diameter of the cylinder defined by the arc surfaces of the shank.

17. The removable gooseneck hitch ball of claim 14, wherein the at least one adaptor has two adaptor arc surfaces and an adaptor flat, the two adaptor arc surfaces collectively defining an adaptor cylinder centered on the central axis, the adaptor cylinder having a greater diameter than a diameter of the cylinder defined by the eight edge lines of the shank.

18. A removable gooseneck hitch ball comprising:

a hitch ball having a generally spherical outer profile receivable in a coupler of a towed vehicle;

a neck extending downwardly from the hitch ball, the neck and the hitch ball defining a generally vertical towing pivot axis;

a shank extending downwardly from the neck, the shank defining a central axis with a contact surface of the shank extending around the central axis, wherein the contact surface can fit within a 2.5×2.5 inch square prism socket while making contact with opposing sides of the square prism socket and wherein the contact surface can fit within a 2.75 inch diameter cylindrical socket while making contact with opposing sides of the cylindrical socket; and two adaptors removably attachable on a bottom of the shank, wherein each of the two adaptors provide two adaptor arc surfaces collectively defining an adaptor cylinder centered on the central axis, the adaptor cylinder being larger in diameter than the cylindrical socket.

19. The removable gooseneck hitch ball of claim 18, wherein the contact surface includes four arc surfaces collectively defining a cylinder centered on the central axis and four flat surfaces parallel to the central axis and inside the cylinder defined by the arc surfaces.

* * * * *